Feb. 12, 1929.
P. ALLEN
BUSH HOOK
Original Filed Dec. 11, 1926
1,701,493
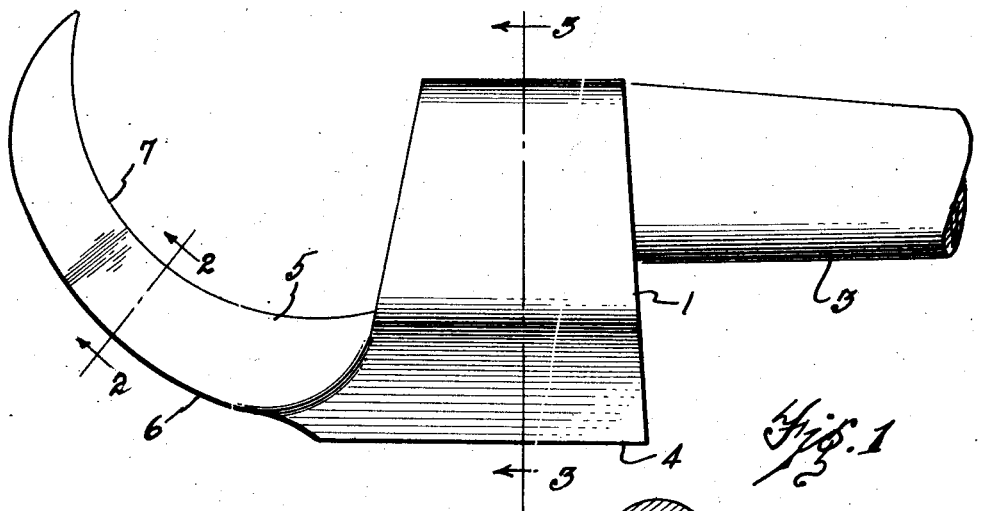
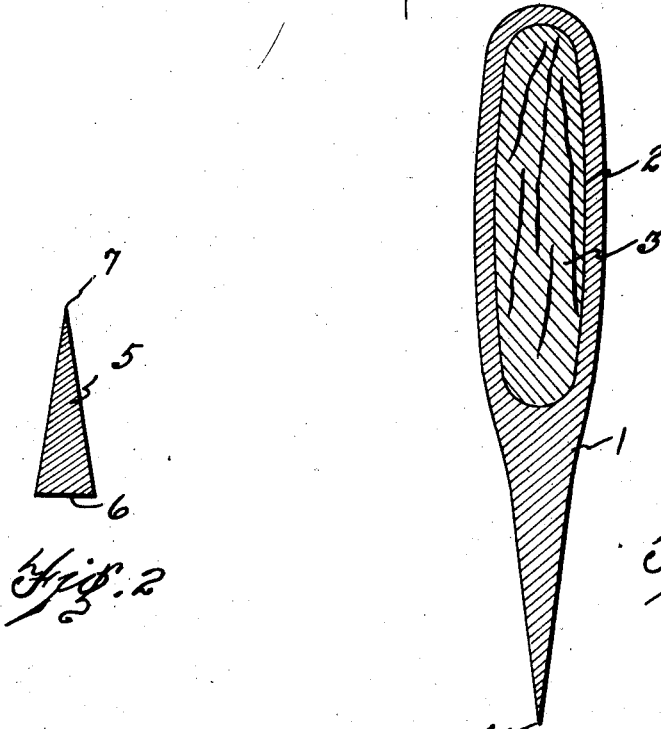
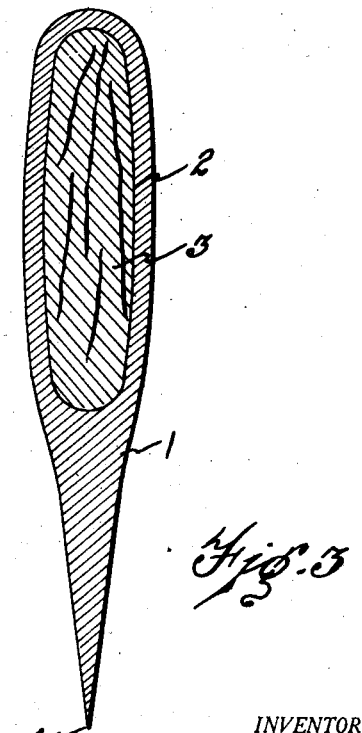
INVENTOR.
PERCY ALLEN
BY
ATTORNEY.

Patented Feb. 12, 1929.

1,701,493

UNITED STATES PATENT OFFICE.

PERCY ALLEN, OF NORTH WAYNE, MAINE, ASSIGNOR TO NORTH WAYNE TOOL COMPANY, OF HALLOWELL, MAINE, A CORPORATION OF MAINE.

BUSH HOOK.

Application filed December 11, 1926, Serial No. 154,263. Renewed December 5, 1928.

This invention relates to bush-hooks, and the object of the invention is to provide a bush-hook having a weighted head to increase the effectiveness of the bush-hook in use.

Another object of the invention is to provide a bush-hook having a weighted head in the form of an ax head for use on bushes and small trees that cannot be readily cut down with the bush-hook.

A further object of the invention is to provide a dual purpose tool which obviates the necessity of carrying two tools for clearing land of bushes and small trees.

Another object of the invention is to provide a weighted bush-hook in which the weight serves a useful purpose.

These objects and the several novel features of the invention are hereinafter more fully described and claimed, and the preferred form of construction by which these objects are attained is shown in the accompanying drawing in which—

Fig. 1 is a side elevation of a bush-hook embodying my invention,

Fig. 2 is an enlarged section taken on line 2—2 of Fig. 1, and

Fig. 3 is an enlarged section taken on line 3—3 of Fig. 1.

The bush hook comprises an ax head 1 shown in Figs. 1 and 3 which is provided with a helve hold 2 therein into which an ax handle 3 is fitted. The ax head 1 is formed to provide a sharp edge 4 in spaced parallel relation with the helve hole 2 and the bush-hook 5 is formed integrally with the portion of the ax head between the helve hole 2 and sharpened edge 4 projecting forwardly from between the helve hole 2 and the edge 4 and extends outwardly on a curve away from the edge of the ax as shown and intersects the axial line of the helve hole 2.

This bush-hook 5 has a thick edge 6 on the outside and the inner edge 7 opposite the sharpened edge 4 of the ax head is sharpened as indicated in Figs. 1 and 2.

The device is used by grasping the end of the handle 3 and drawing the head toward the user to cut off small bushes with the bush-hook 5. The weight of the ax head increases the weight of the bush-hook to such extent that with short quick movements the bush-hook may be made to cut through all ordinary bushes, and for cutting through very large bushes and small trees the sharp edge 4 of the tool may be used as an ax. Ordinarily in work of this type a separate bush-hook and a separate ax are used. The bush-hook is generally used much more than the ax and when the user comes to a small tree he must go back and get his ax to cut down the tree causing him considerable waste of time. With applicant's bush-hook both the ax and bush-hook are combined in one instrumentality and the weight of the ax head increases considerably the effectiveness of the bush-hook while the bush-hook does not interfere with the use of the tool as an ax.

From the foregoing description it becomes evident that the device is very simple and efficient in operation, provides a very effective tool for clearing land, and further provides a device which accomplishes the objects described.

Having thus fully described my invention, its utility and mode of operation, what I claim and desire to secure by Letters Patent of the United States is—

1. A bush-hook comprising an ax head having a helve hole and a sharpened edge in spaced parallel relation, and a bush-hook formed integrally with the portion of the ax head between the helve hole and sharpened edge and extending outwardly on a curve away from the sharpened edge of the ax, the bush-hook intersecting the axial line of the helve hole, and the edge of the bush-hook opposite the sharpened edge of the ax head being sharpened.

2. A bush-hook comprising an ax head having a helve hole and a sharpened edge in spaced parallel relation, and a bush-hook formed integrally with the portion of the ax head between the helve hole and sharpened edge and extending outwardly on a curve away from the sharpened edge of the ax and intersecting the axial line of the helve hole.

In testimony whereof I sign this specification.

PERCY ALLEN.